Jan. 7, 1969  B. L. HOFFMAN  3,420,088
MANUFACTURING OF CONTAINERS BY DEEP DRAWING
Filed Sept. 27, 1965  Sheet 3 of 4
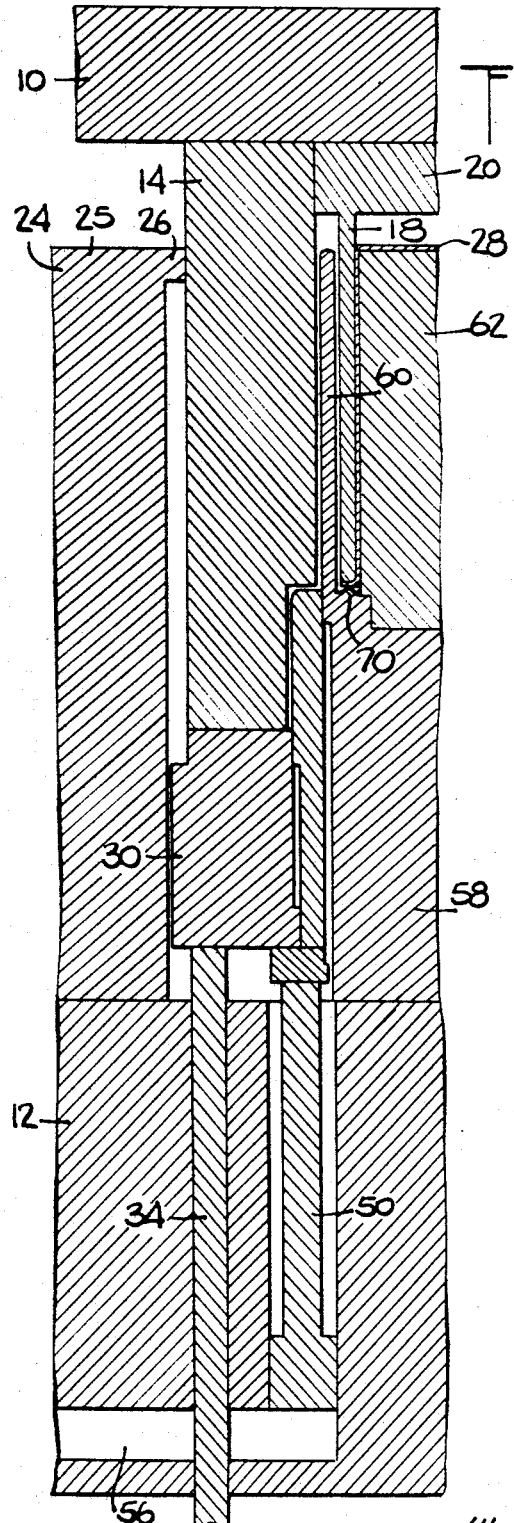
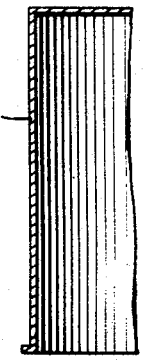
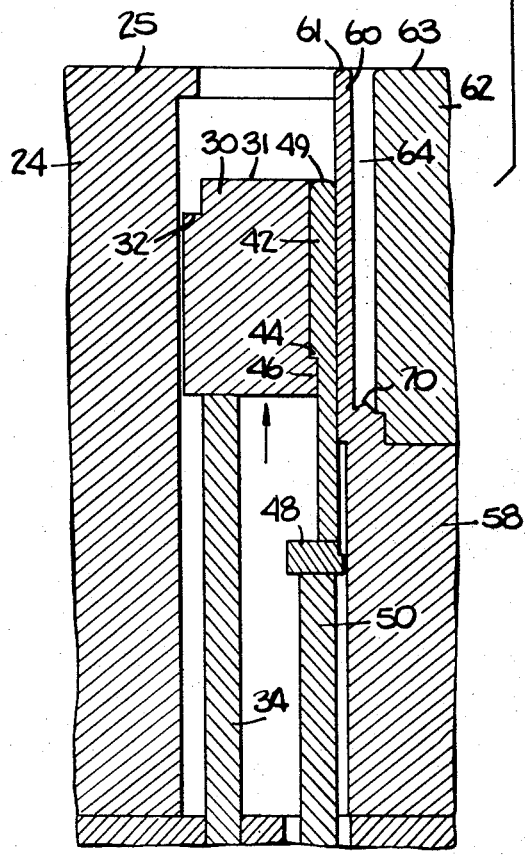
INVENTOR.
BERNARD L. HOFFMAN
BY
ATTORNEYS

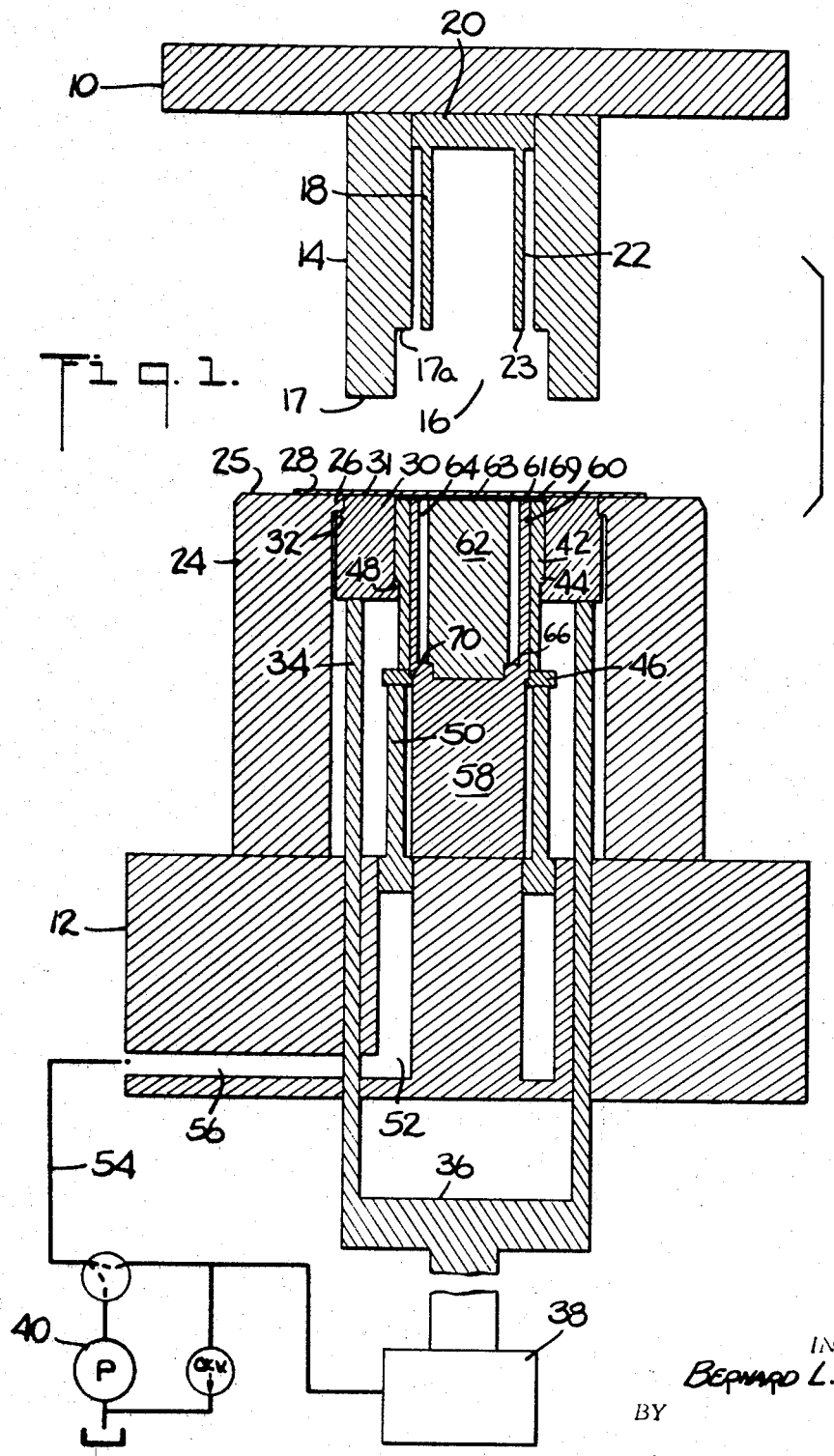

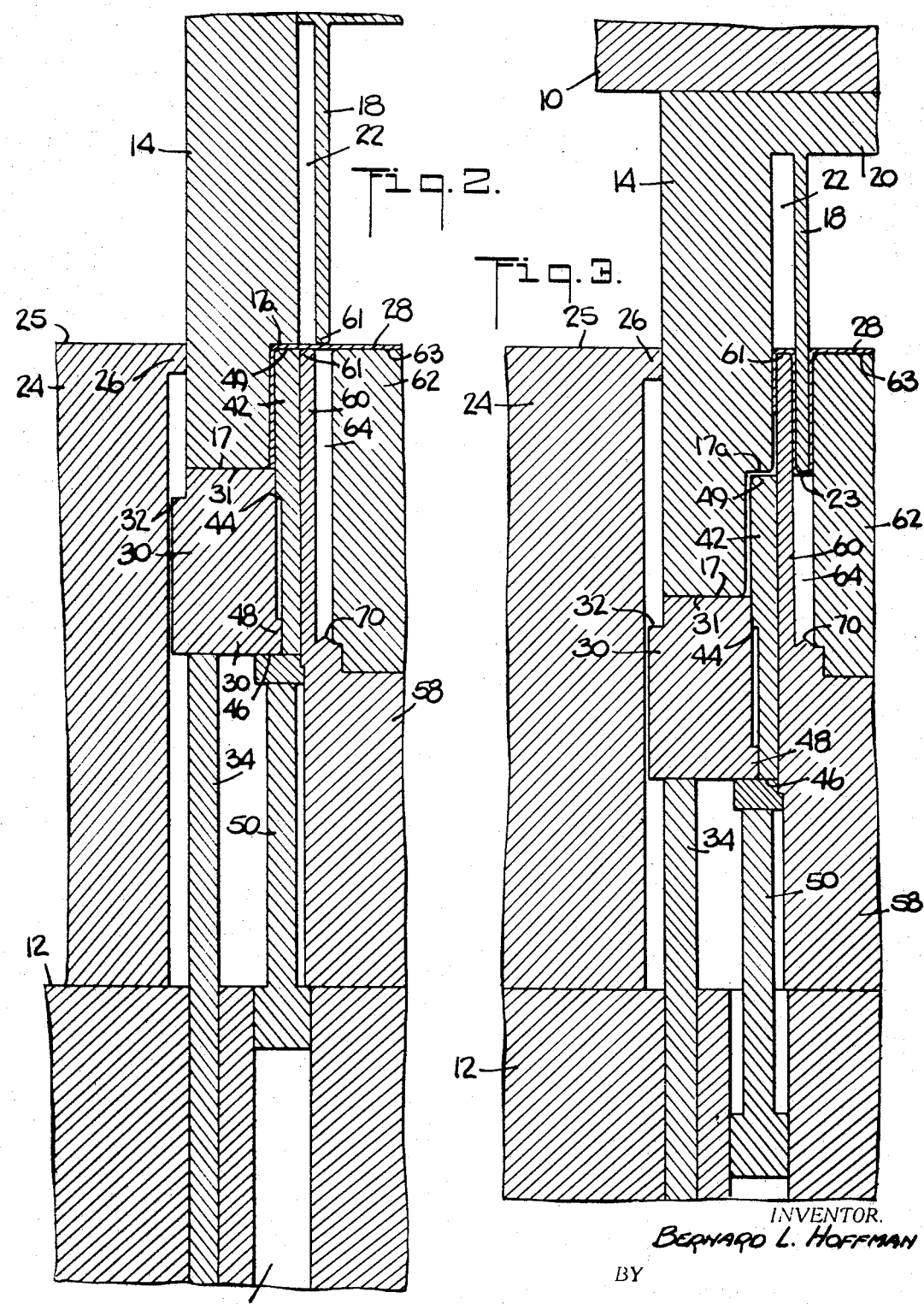

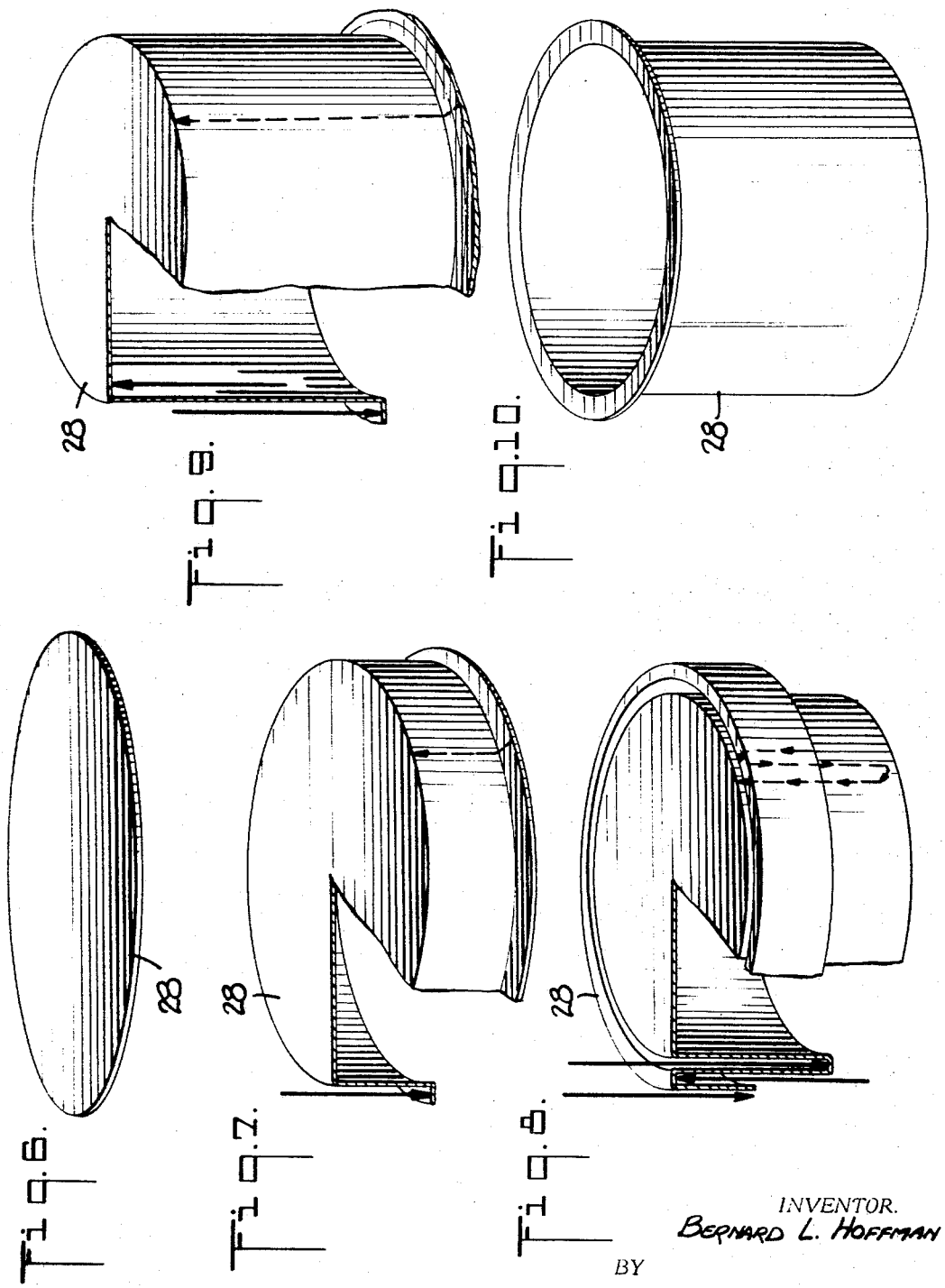

United States Patent Office 3,420,088
Patented Jan. 7, 1969

3,420,088
MANUFACTURING OF CONTAINERS BY
DEEP DRAWING
Bernard L. Hoffman, Trenton, N.J., assignor to Frederick
A. Krause Associates, Inc., Frenchtown, N.J., a corporation of New Jersey
Filed Sept. 27, 1965, Ser. No. 490,294
U.S. Cl. 72—349                    12 Claims
Int. Cl. B21d 22/24

ABSTRACT OF THE DISCLOSURE

Deep drawing arrangements wherein sheet metal to be drawn is simultaneously forced into a number of concentrically disposed cavities so as to maintain a distribution of bending and stretching stresses throughout the metal.

---

This invention relates to metal forming and, more particularly, it concerns the production of cup shaped objects from sheet metal.

In the past metal containers, such as cans, have been formed from sheet stock by bending the stock about a cylindrical form and welding its edges together to form a longitudinal seam. Circular tops and bottoms were then separately cut out and thereafter attached to the ends of the container. This technique, while widely practised, nevertheless, suffers from certain disadvantages, among which are a high cost of production and limited production rates due to the complexity of the forming operation.

It has been proposed to form containers by deep drawing, that is, by pressing sheet metal over die elements so as to convert it to cup shaped configuration. This approach, however, has not come into widespread use in certain industries, such as in the beverage packaging industry, for the cost of producing cans and similar containers in this manner has been significantly greater than conventional fabrication procedures require. This is primarily because the degree or depth of draw attainable in a given operation is limited due to the high stresses involved. Because of this, it has been necessary to resort to a series of successive drawing operations each of which brings the object closer to its desired finished configuration. These succesive drawing operations, besides complicating production introduce a further disadvantage in that they cause work hardening and embrittlement of the metal so that it has to be annealed between each successive drawing operation in order to restore sufficient ductility to permit the next stage of drawing.

It has additionally been proposed to draw sheet metal in successive stages on a complex die arrangement, each stage acting primarily on a different region of the material so as to eliminate annealing and to permit all of the drawing operations to be carried out by a single press operation in one cycle of drawing press operation. This technique however is limited due to the fact that the regions of the metal blank which were drawn in the first stages of drawing must again be drawn to a certain degree, though to a lesser extent, in the later stages. A further and very signficant disadvantage of this multi-staged technique lies in the fact that the required stroke of the drawing press must be greater than the sum of the lengths of the container at each stage of the drawing operation.

According to the present invention, cup shaped containers are drawn from sheet metal blanks to a full finished length in a single operation which requires no annealing and which requires a press stroke which is significantly shorter than that required by prior multi-stage drawing devices. The drawn product moreover has a more uniform wall thickness and higher strength for a given degree of draw than is usually achieved in products produced in accordance with prior art arrangements.

The present invention accomplishes these improved results by effecting a simultaneous deformation over the entire blank during each of the stages of the drawing operation. This distribution of deformation is achieved by causing several stages of drawing to be undertaken at the same time.

As illustratively carried out the present invention comprises the application of pressure against one side of a sheet metal blank along mutually displaced concentric ring shaped regions while at the same time applying oppositely directed pressure against the other side of the blank in the intermediate regions. The blank thus undergoes several inversions simultaneously, finally having its outer edge pulled completely into the central region. During such inversions, the entire blank is subjected to tensile and bending stresses which serve to maintain an even temperature distribution and consequent uniformity of metal flow which is essential to good drawing.

In one of its aspects the present invention makes use of a plurality of upper and lower die elements in the form of concentric rings which intermesh upon closure of a press in which they are mounted. The die elements are dimensioned such that intermeshing takes place in several diametric regions simultaneously. Thus, as the die elements come together over a sheet metal blank, they act to produce drawing in alternate directions over successive diametral ring shaped regions simultaneously. As the die elements intermesh further the outer edge of the blank is finally pulled through to the innermost die element.

As will be described more fully hereinafter, the present invention as illustratively practiced makes use of a preliminary drawing operation which converts flat sheet material to a shallow drawn cup shaped configuration; and thereafter this shallow cup shaped configuration is further drawn in alternate directions simultaneously along concentric ring shaped regions. The preliminary drawing, of course, should not stress the material to a point where annealing would be required for continued drawing.

There has thus been outlined rather broadly the more important features of the invention in order that the detailed description thereof that follows may be better understood, and in order that the present contribution to the art may be better appreciated. There are, of course, additional features of the invention that will be described hereinafter and which form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is an elevational view taken in section illustrating a drawing apparatus embodying the present invention in position to begin drawing;

FIG. 2 is an enlarged fragmentary view showing a portion of the apparatus of FIG. 1 in a first stage of a drawing operation;

FIG. 3 is a view similar to FIG. 2 showing the apparatus in a second stage of a drawing operation;

FIG. 4 is a view similar to FIGS. 2 and 3 showing the apparatus in a third stage of a drawing operation;

FIG. 5 is a view similar to FIGS. 2 and 8 but showing only a lower portion of the apparatus upon completion of a drawing operation along with a portion of a fully drawn ejected object; and FIGS. 6–10 illustrate a workpiece object in successive stages of drawing respectively as carried out according to the present invention.

The drawing apparatus shown in FIG. 1 comprises upper and lower die shoes 10 and 12 which are adapted to be mounted respectively in the upper and lower jaws of a punch press (not shown) and thereby moved by the press toward and away from each other in a vertical direction. A tubularly shaped punch element 14 is fixed to and extends downwardly from the upper die shoe 10. The punch element 14 is counterbored to provide a region 16 into which preliminary drawing takes place as will be explained hereinafter. This counterboring forms a pair of longitudinally displaced outer end surfaces 17 and 17a which act at different stages of the drawing operation.

A tubularly shaped upper forming element 18 extends downwardly within the punch element 14 and is mounted by means of a disk shaped base portion 20 which fits against the upper die shoe 10 within the punch element 14. As shown in the drawing, the upper forming element 18 has an outer diameter which is smaller than the inner diameter of the punch element 14 so that there is defined between these two elements, a first annularly shaped upper forming cavity 22. Also, as shown in the drawing, the upper forming element 18 extends only as far as, but not into the counterbored region 16, so that it provides an outer end surface 23 which is substantially coplanar with the outer end surface 17a of the punch element 14.

On the lower die shoe 12 there is provided a generally tubularly shaped outer cut ring 24 which extends upwardly from the surface of the shoe 12, with an outer end surface 25 which faces the upper die shoe 10. A shoulder 26 protrudes radially inwardly from the outer end surface 25 of the outer cut ring 24. This shoulder 26 defines an opening which is dimensioned to closely accommodate the punch element 14 when the upper and lower die shoes 10 and 12 are brought toward each other. The mutually facing corners of the outer cut ring 24 and the punch element 14 are made especially sharp and well defined so that as the punch element 14 enters into the cut ring 24 a shearing action will be produced upon a sheet metal blank or workpiece 28 which rests across the outer cut ring 24.

A ring shaped holding pad 30 fits immediately inside the outer cut ring 24, and is provided with an outer ledge 32 about its periphery which engages the undersurface of the shoulder 26 to prevent movement out from the outer cut ring 24. In this position, as shown in FIG. 1, an outer end surface 31 of the holding pad 30 is maintained substantially coplanar with the outer end surface 25 of the outer cut ring 24. The holding pad 30, may however, move downwardly inside the outer cut ring 24 against the upward biasing force of a series of pressure pins 34. These pressure pins are mounted on a common yoke 36 underneath the lower die shoe 12. The yoke 36 in turn is biased in an upward direction by means of a piston and cylinder assembly 38 which receives hydraulic power from a pump 40.

A tubularly shaped outer forming ring 42 fits closely within the ring shaped holding pad 30. The outer forming ring 42 has upper and lower ledges 44 and 46 which engage a protruding shoulder 48 on the holding pad 30 after limited relative movement with the holding pad. The outer form ring 42 is biased upwardly to a normal position so that an outer end surface 49 thereof is substantially coplanar with the outer end surface of the holding pad 30 and the outer cut ring 24 as shown. This upward biasing is accomplished by means of forming ring pistons 50 which move up and down within piston bores 52 in the lower die shoe 12. These piston bores 52 are subjected to hydraulic pressure from the pump 40 via a hydraulic line 54 and an oil port 56 in the lower die shoe 12. The hydraulic pressure from the pump 40 tends to urge the forming ring piston 50 and the outer forming ring 42 toward an uppermost position as shown in FIG. 1.

There is additionally provided on the lower die shoe 12 a central forming assembly comprising a cylindrical base 58 which rises from the center of the lower die shoe 12 to a point approximately halfway to the top of the outer cut ring 24. Beyond this point a tubularly shaped inner forming ring 60 extends up to a point such that an outer end surface 61 thereof is substantially coplanar with the outer end surface 25 of the outer cut ring 24. The inner form ring 60 fits closely inside the outer form ring 42 as shown. A cylindrically shaped central bottom form 62 is fixed to the cylindrical base 58 and extends upwardly therefrom in coaxial relationship with and inside the inner forming ring 60. The central bottom form 62 has an outer end surface 63 which is substantially coplanar with the outer end surface 61 of the inner forming ring 60. The diameter of the central bottom form 62 is smaller than the inner diameter of the inner forming ring 60 so that there is defined between these two elements a second annularly shaped forming cavity 64. This second forming cavity 64 is aligned with and receives the upper forming element 18 of the upper die shoe 10 when the die shoes are moved toward each other. Similarly the inner forming ring 60 is dimensioned to extend into the annularly shaped upper forming cavity 22 during such movement of the die shoes.

The cylindrical base 58 is also formed with a cutting ring ridge 66 at the lower surface of the annularly shaped lower forming cavity 64. This cutting ring ridge 66 co-operates with the lower edge of the upper forming element 18 to produce a trimming cut upon completion of the forming operation. The base 58 is also provided with an outer shoulder 70 which engages with the outer forming ring 42 to limit the degree of its upward movement under the influence of the form ring pistons 50.

As shown, the enlarged section views of FIGS. 2–4, the dimensions of the various described elements and their arrangement is such that when the die shoes 10 and 12 are coved toward each other, the punch element 14 will fit closely inside the outer cut ring 24, the outer forming ring 42 will enter the counterbored region 16 of the punch element 14, the inner form ring 60 will enter the first annularly shaped cavity 22, the upper forming element 18 will enter the second annularly shaped cavity 64 and the bottom form 62 will enter into the upper forming element 18. Because a shearing action is produced between the punch element 14 and the outer cut ring 24, these two elements are dimensioned for a close fit. However, all other intermeshing elements are, as shown in FIGS. 2–4, dimensioned for sufficient clearance to accommodate the metal being drawn. Also, as shown in the enlarged presentation of FIGS. 2–4, each of the corners of the outer end surfaces in both die assemblies, except those corners used for shearing, as above described, are rounded to a given radius in order to achieve a controlled amount of metal reduction during each stage of drawing.

In operation, the above described die arrangement follows the sequence of movements illustrated in FIGS. 1–5. As shown in FIG. 1, the upper and lower die shoes 10 and 12 are in their fully opened position, so that the various die elements mounted on these shoes are separated from each other. The workpiece 28 is laid across the top of the outer cut ring 24 as shown in FIG. 1 and the upper and lower die shoes are then brought toward each other as shown in FIGS. 2–4.

As the die shoes 10 and 12 are brought toward each other, the lowermost outer end surface 17 of the punch element 14 contacts the workpiece 28 immediately above the outer end surface 31 of the holding pad 30. As the die shoes are brought toward each other, the downward force of the punch element 14 overcomes the hydraulic force operating through the piston and cylinder assembly 38 which urges the holding pad 30 in its uppermost position. Consequently, the holding pad 30 moves downwardly under the force of the punch element 14. At the same time, the shearing corners of the shoulder 26 of the outer cut ring 24 and at the outer edge of the end surface 17 of the punch element 14 operate to cut the workpiece blank 28 to a circular configuration as illustrated in the perspective view of FIG. 6.

Continued downward movement of the punch element 14 causes a preliminary drawing of the outer region of the blank 28 over the outer surface of the outer form ring 42. During this preliminary forming operation, the upward force exerted by the holding pad 30 cooperates with the bottom surface of the punch element 14 to squeeze or iron the workpiece blank 28 and prevent wrinkling or other distortion thereof during this initial phase of the drawing operation. While the blank is undergoing this preliminary drawing operation, it attains a partially drawn inverted cup shaped configuration as illustrated in FIG. 7. This preliminary drawing operation serves to arrange the workpiece blank in a configuration such that the simultaneous drawing to be carried out thereafter will require no further ironing or squeezing. Thus all subsequent restrainst on the blank is provided by the mutually cooperating effects of the various drawing operations simultaneously being carried out. In this connection, it should be noted that the length to diameter ratio of the counterbored region 16 should be such that the stresses set up in this preliminary drawing are substantially below the amount which would require annealing for subsequent drawing.

Continued downward movement of the upper die shoe 10 with respect to the lower die shoe 12 causes the inner form ring 60 to force workpiece metal up into the first annularly shaped forming cavity 22, while at the same time the tubularly shaped upper forming element 18 urges workpiece metal down into the second annularly shaped forming cavity 64. At the same time, the bottom form 62 urges a different region of the workpiece 28 up into the cylindrical cavity formed by the inner surface of the upper forming element 18. The manner in which this takes place is illustrated in FIG. 3 and the configuration of the workpiece or blank 28 during this portion of the drawing operation is illustrated in perspective in FIG. 8. It will thus be appreciated that there are simultaneously applied downwardly directed pressures throughout mutually displaced concentric ring shaped regions on the upper surface of the workpiece 28 along with corresponding oppositely directed pressures in the intermediate regions of the lower side of the blank. Such simultaneous application of stress in distributed locations throughout the blank cause it to undergo stretching and deformation simultaneously over a considerable portion of its area. This maintains the metal throughout the entire blank in motion at all times and thus keeps the metal in a flowable state so that a considerable degree of drawing may be effected while maintaining a minimum stress concentration and effecting a more uniform flow of metal throughout the drawing operation.

As the upper and lower die shoes 10 and 12 continue to come together, the blank 28 is wiped over the upper corners of the inner form ring 60 and the lower corners of the upper forming element 18 so that eventually the entire portion of the drawn material is pulled into the region between the bottom form 62 and the upper forming element 18, thus forming a fully drawn container shaped object 72 shown in FIG. 9. When the die shoes 10 and 12 reach their fully closed position the bottom edge of the upper forming element 18 presses down against the cutting ring ridge 66 as shown in FIG. 4 to produce trimming of the fully drawn blank. After this portion of the drawing operation, the fully drawn and trimmed object 72 has the finished configuration illustrated in FIG. 10.

Upon completion of the drawing operation, the upper and lower die shoes are moved apart and the blank is ejected from the die elements as shown in FIG. 5. The raising of the upper die shoe 10 and the punch element 14 also releases the holding pad 30 and the outer form ring 42 so that the hydraulic pressure supplied by the pump 40 operating through the piston and cylinder assembly 38 and the form ring pistons 50 may cause these elements to move to their original positions as illustrated in FIG. 1.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. Apparatus for use in deep drawing container shaped objects from sheet material, said apparatus comprising a first die assembly including at least two longitudinal die elements relatively longitudinally immoveable and having outer end surfaces, said two longitudinal die elements being coaxially arranged and configured to define between them an annularly shaped cavity, a second die assembly having a longitudinal tubularly shaped die element arranged and dimensioned to enter into said annularly shaped cavity when said die elements are brought toward each other, each of the mutually facing corners at the outer end surfaces of each of said die elements being provided with a radius for controlled drawing, and means for maintaining a flat sheet metal workpiece against the end of the outer of said two longitudinal die elements whereby as said die assemblies come together over a workpiece they produce simultaneous drawing over all of said corners in different radially displaced regions of the workpiece with consequent distribution and maintenance of stresses throughout the workpiece for more uniform and deeper drawing.

2. Apparatus for use in deep drawing container shaped objects from sheet material, said apparatus comprising a first die assembly which includes a first pair of longitudinal die elements arranged in spaced coaxial relationship and defining between themselves a first annularly shaped cavity, a second die assembly comprising a second pair of longitudinal die elements also arranged in spaced coaxial relationship and having outer end surfaces also lying close to a common plane, and defining between them a second annularly shaped cavity, the inner of said second pair of die elements being dimensioned and arranged to enter into said first cavity, the outer of said first pair of die elements being dimensioned to enter at the same time into said second cavity as said die assemblies are brought together, each of the mutually facing corners at the outer end surfaces of each of said die elements being provided with a radius for controlled drawing, and means for maintaining a flat sheet metal workpiece against the end of the outer of said pair of longitudinal die elements whereby as said die assemblies come together over a workpiece they produce simultaneous drawing in different regions of the workpiece with consequent distribution and maintenance of stresses throughout the workpiece for more uniform and deeper drawing.

3. Apparatus for use in deep drawing container shaped objects, said apparatus comprising a first die assembly which includes a first tubular die element having a counterbored configuration forming longitudinally displaced outer end surfaces, a second tubular die element extending coaxially within said first tubular die element and terminating at the counterbored region thereof, said elements defining between them a first annular cavity, a second die assembly which includes a central cylindrical die element and a third tubular die element in coaxial arrangement and defining therebetween a second annular cavity, the outer end surfaces of said central cylindrical die element and said third tubular die element being maintained close to a common plane, said central cylindrical die element and said third tubular die element further being dimensioned and arranged such that said second tubular die element enters into said second annular cavity substantially simultaneously with entry of said third tubular die element into said first annular cavity as said die assemblies are brought together, an outer forming ring fitted closely about said third tubular die member and movable longitudinally therealong, said outer forming ring being dimensioned to enter into the counterbored region of said first tubular die member, means operative to maintain the outer end surface of said outer forming ring coplanar with the outer end surface of said third tubular die element while they are in the counterbored region of said first tubular die element and to produce relative longitudinal retraction of said outer forming ring as said die assemblies continue to come together.

4. Apparatus for use in deep drawing container shaped objects, said apparatus comprising a first die assembly which includes first and second tubular die elements, the first element being counterbored toward its outer end to form separate longitudinally displaced outer end surfaces, the second element extending along inside the first element and terminating at the counterbored region thereof and defining with said first element a first annular cavity, a second die assembly including a central cylindrical die element and a third tubular die element in coaxial relationship with their outer end edges maintained substantially coplanar and defining between themselves a second annular cavity, said die elements being dimensioned and arranged such that as said die assemblies come together said second tubular element enters into said second annular cavity while said third tubular element enters into said first annular cavity, further die means arranged to effect a preliminary draw of sheet material into the counterbored region of said first tubular die element as said die assemblies first come together and means operative to retract said further die means to permit continued coming together of said die assemblies.

5. Apparatus as in claim 4 further including a fourth tubular member on said second die assembly and formed and dimensioned to cooperate with the outermost corner of said first tubular element to produce a preliminary shearing action on a blank being drawn.

6. Apparatus as in claim 4 also including a cutting ridge at the bottom of said second annular cavity for cooperating with the outer end of said second tubular element to produce a final trim along the edges of a fully drawn object.

7. Apparatus as in claim 4 wherein said further die means comprises an outer ring member which fits closely about said third die element and moves longitudinally therealong, the outer diameter of said outer ring member being such as to permit drawing of sheet material into the counterbored region of said first tubular element and means biasing said outer ring member to a position such that its outer end surface is normally coplanar with the outer end surfaces of said cylindrical die element and said third tubular die element.

8. Apparatus as in claim 7 wherein said means operative to retract said further die means comprises a ring shaped holding pad surrounding said outer ring member and biased to a normal position with its outer end surface substantially coplanar with the outer end surfaces of said cylindrical die element and said third tubular die element, said holding pad being depressible by the force of the outermost end surface of said first tubular element and stop means on said holding pad engaging and retracting said outer ring member when said holding pad retracts to a position commensurate with completion of said preliminary draw.

9. Apparatus as in claim 8 wherein said holding pad and outer ring members are hydraulically biased to their said normal positions.

10. A method for forming deep drawn cup shaped objects from sheet material, said method comprising the steps of first drawing said material to a shallow cup shaped configuration and during such first drawing maintaining the stresses in the material substantially below the amount which would require annealing for subsequent drawing and thereafter simultaneously drawing said material in alternate directions in successive concentric ring shaped regions and continuing the drawing in the innermost region until the entire material of said blank has been pulled through the outer regions.

11. Apparatus for use in deep drawing container shaped objects from sheet material, said apparatus comprising a first die assembly including at least two concentric tubular shaped die elements, relatively longitudinally immoveable, and having interior and exterior surfaces which define a first central drawing cavity and at least one outer annular cavity all coaxially arranged, and a second die assembly including a plurality of coaxially arranged die elements, also relatively immoveable, and configured to enter simultaneously into each of said cavities as said die assemblies are moved together, the ends of each die element on each assembly being rounded to permit the drawing of sheet material into each of said cavities whereby when said die assemblies are moved together, sheet material therebetween is simultaneously worked in concentric rings.

12. A method for forming cup shaped objects from sheet material comprising the steps of applying pressure against one side of the sheet material in mutually displaced concentrically arranged ring shaped regions while at the same time applying oppositely directed pressure to the opposite side of the sheet material in a manner to draw said sheet material simultaneously into the innermost ring shaped region and into the spaces between each of the ring shaped regions, and continuing the application of said oppositely directed pressure until said sheet material becomes substantially fully drawn through each of said ring shaped regions and into the innermost ring shaped region.

References Cited

UNITED STATES PATENTS

| | | | |
|---|---|---|---|
| 460,594 | 10/1891 | Norton | 72—347 |
| 491,192 | 2/1893 | Schoen | 72—349 |
| 1,581,680 | 4/1926 | Gueritey | 72—354 |
| 1,672,694 | 6/1928 | Shrum | 72—348 |
| 1,690,523 | 11/1928 | Bell | 72—348 |
| 2,259,882 | 10/1941 | Glasner | 72—354 |
| 2,739,557 | 4/1956 | Staubitz | 72—349 |

RICHARD J. HERBST, *Primary Examiner.*